(12) United States Patent
Thompson et al.

(10) Patent No.: US 6,959,530 B2
(45) Date of Patent: Nov. 1, 2005

(54) PIVOTAL KNIFE MOUNTING ARRANGEMENT

(75) Inventors: Kent Thompson, Otley, IA (US); Rustin V. Bentzinger, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 10/912,720

(22) Filed: Aug. 5, 2004

(65) Prior Publication Data
US 2005/0016150 A1 Jan. 27, 2005

Related U.S. Application Data

(62) Division of application No. 10/387,100, filed on Mar. 12, 2003, now Pat. No. 6,834,486.

(51) Int. Cl.$^7$ ............................................. A01D 34/73
(52) U.S. Cl. ...................................................... 56/295
(58) Field of Search ................ 56/255, 295; 29/402.03; 30/296.1, 329, 330, 337, 339

(56) References Cited

U.S. PATENT DOCUMENTS

| 3,321,894 | A | * | 5/1967 | Ingram ........................ 56/295 |
| 3,452,524 | A | * | 7/1969 | Guetterman .................. 56/295 |
| 3,918,241 | A | * | 11/1975 | Stillions ...................... 56/12.7 |
| 4,229,933 | A | * | 10/1980 | Bernard ........................ 56/295 |
| 4,815,264 | A | * | 3/1989 | Mijnders ...................... 56/295 |
| 5,271,212 | A | * | 12/1993 | Anderson .................... 56/12.7 |
| 5,622,035 | A | * | 4/1997 | Kondo et al. ................ 56/12.7 |
| 5,626,007 | A | * | 5/1997 | Harrington et al. .......... 56/13.5 |
| 5,791,131 | A | * | 8/1998 | Hill et al. ..................... 56/295 |
| 6,055,798 | A | * | 5/2000 | Fulmer et al. ............... 56/12.7 |
| 6,182,430 | B1 | * | 2/2001 | Blarek et al. ................. 56/295 |
| 6,305,153 | B1 | | 10/2001 | Neuerburg |
| 6,357,215 | B1 | * | 3/2002 | Thorne ........................ 56/295 |
| 6,367,235 | B1 | * | 4/2002 | Moynihan ................... 56/17.5 |
| 2002/0194829 | A1 | | 12/2002 | Petersen |
| 2004/0177484 | A1 | * | 9/2004 | Thompson ............... 29/402.03 |

FOREIGN PATENT DOCUMENTS

EP  EP 0 517 645 A1  12/1992

* cited by examiner

Primary Examiner—Robert E. Pezzuto
Assistant Examiner—Nathan Mammen
(74) Attorney, Agent, or Firm—Sturm & Fix LLP

(57) ABSTRACT

An improved mounting arrangement for a knife to a disc for use on a rotary disc cutter that eliminates the need for a threaded connector and the associated nut is disclosed. It also provides a positive retention method on the top side of the disc. In addition, it provides a method of removing the knife from the disc without the use of wrenches, simply requiring a tool for prying, such as a screw driver. A further feature is a low profile retainer that does not need to be protected by a wear protector.

4 Claims, 8 Drawing Sheets

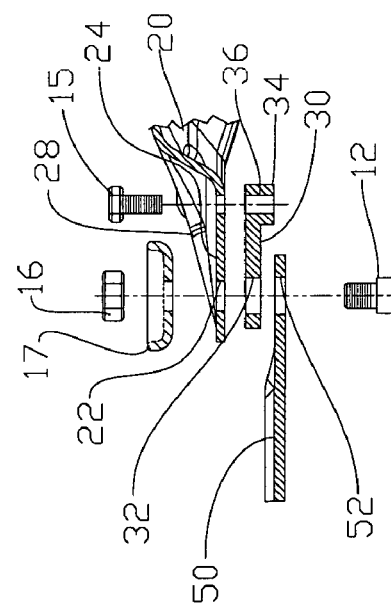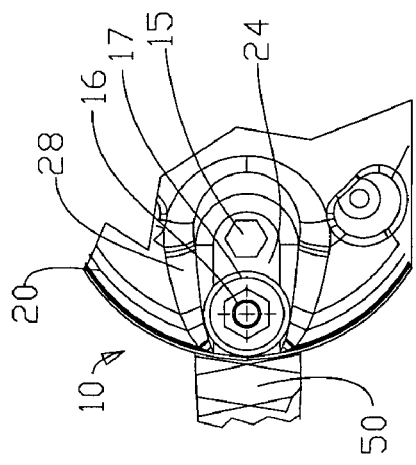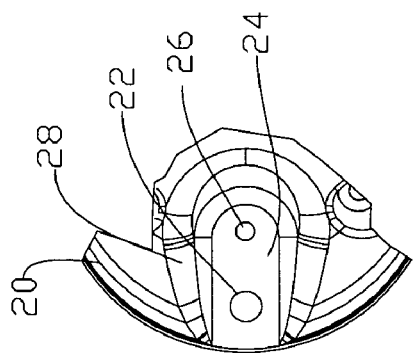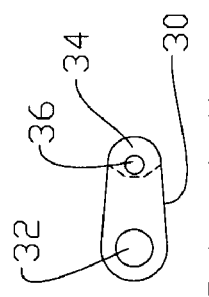
Fig 1 (Prior Art)
Fig 3 (Prior Art)
Fig 2 (Prior Art)
Fig 4 (Prior Art)

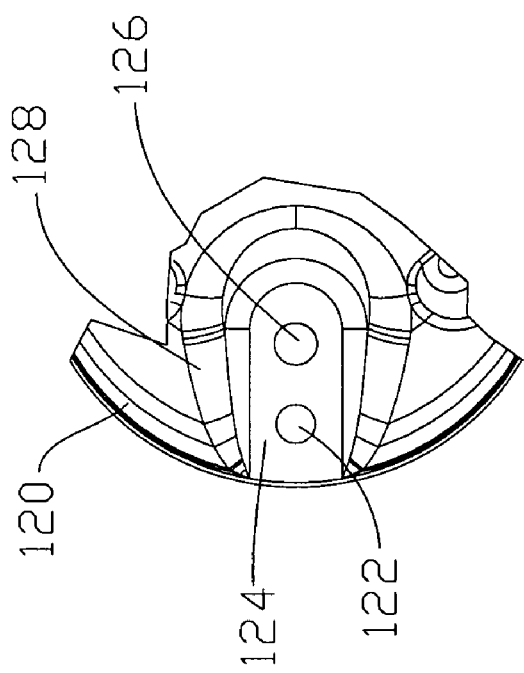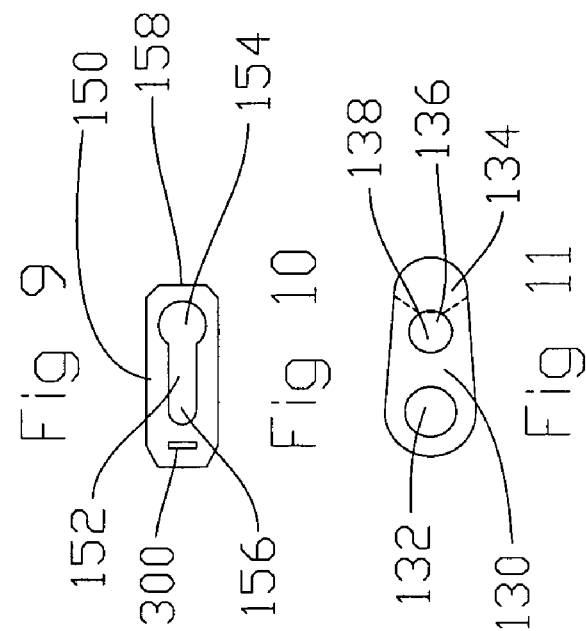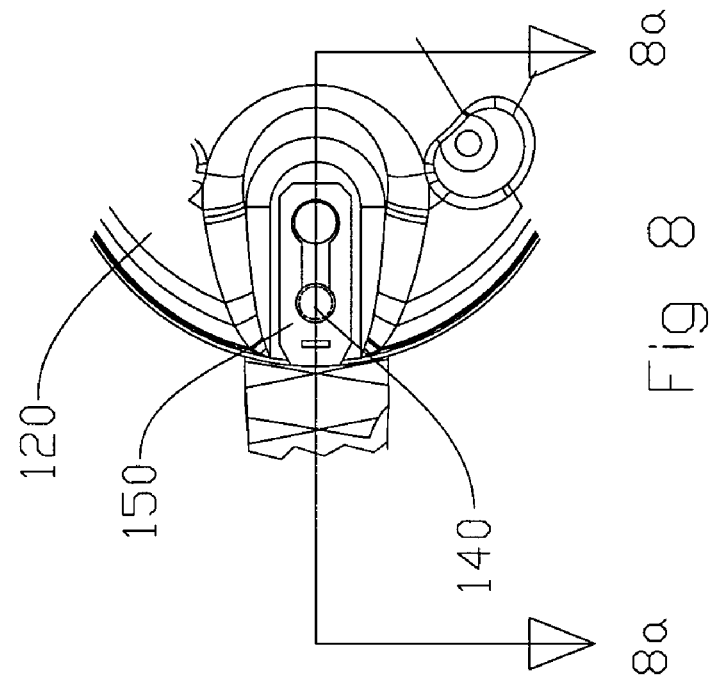

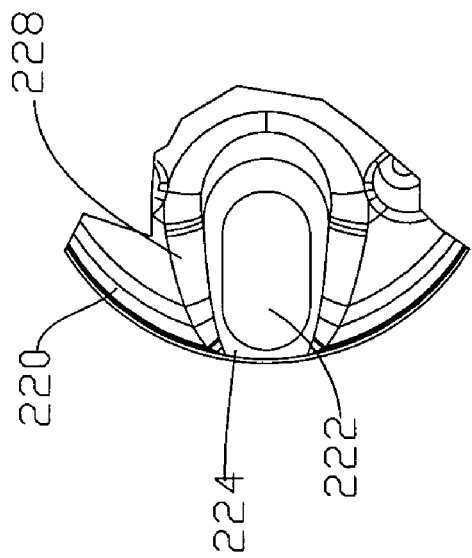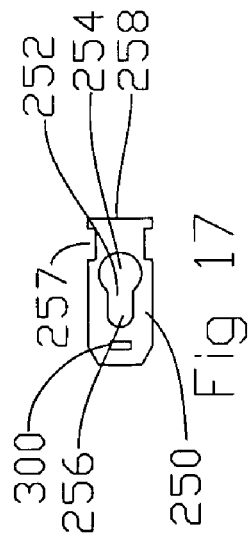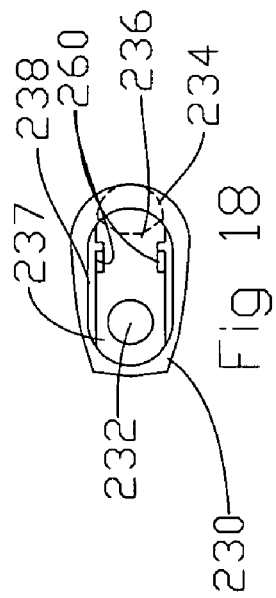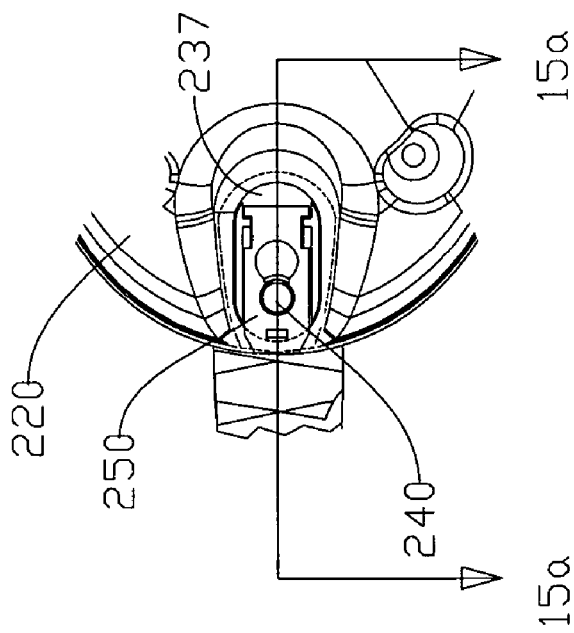

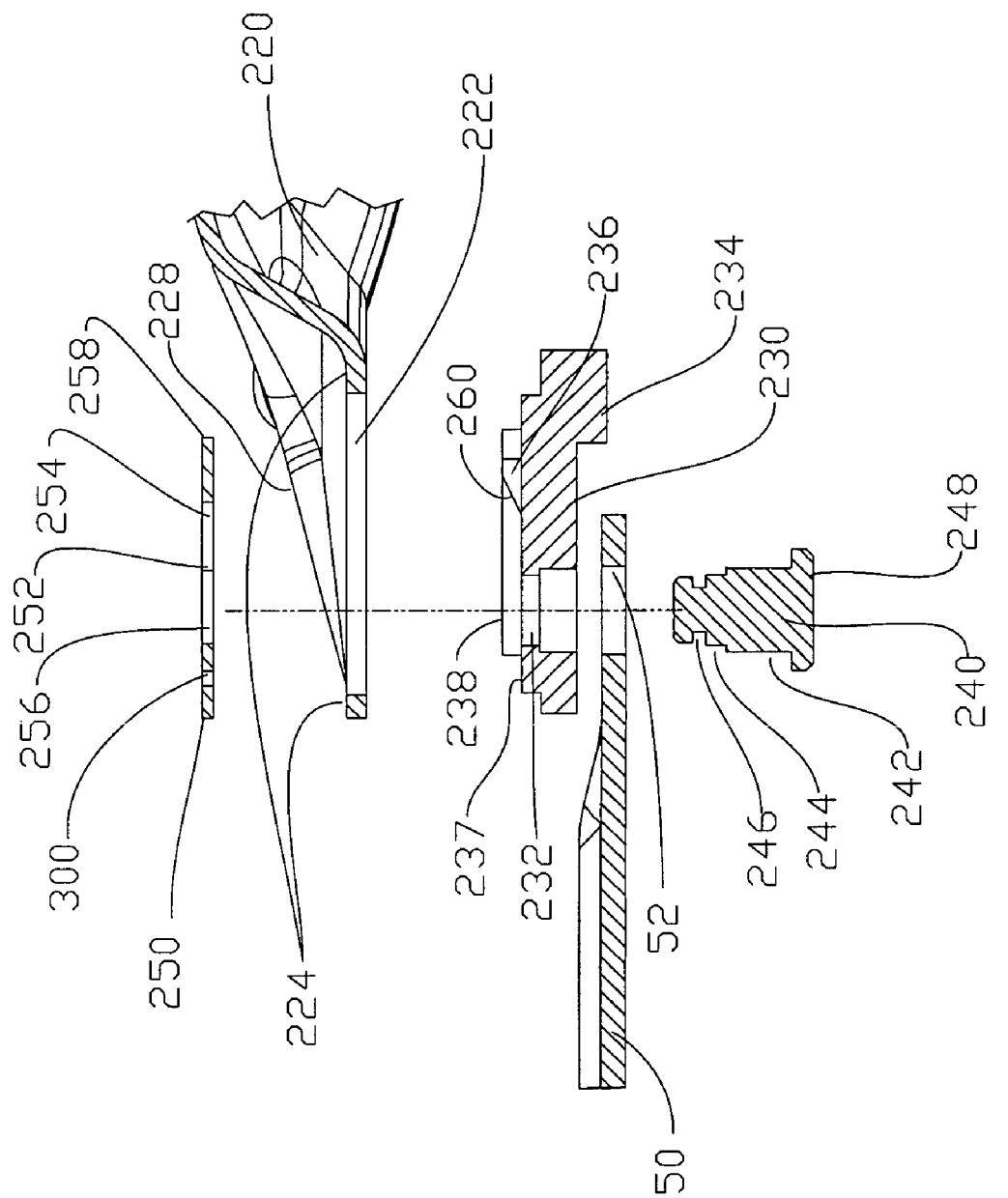

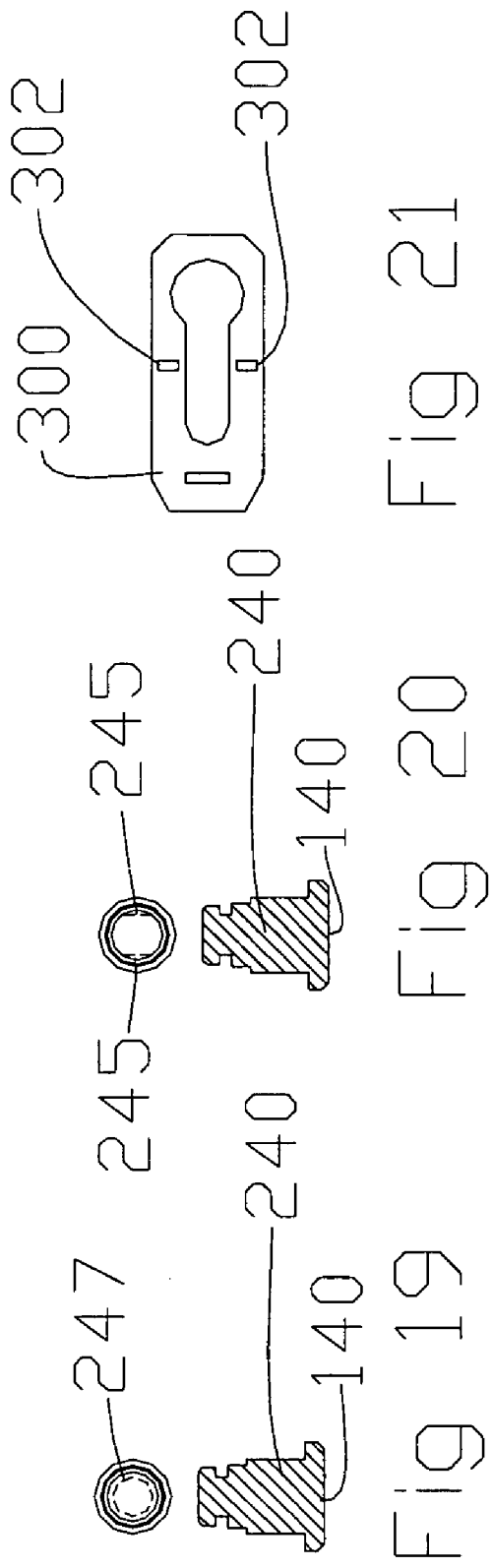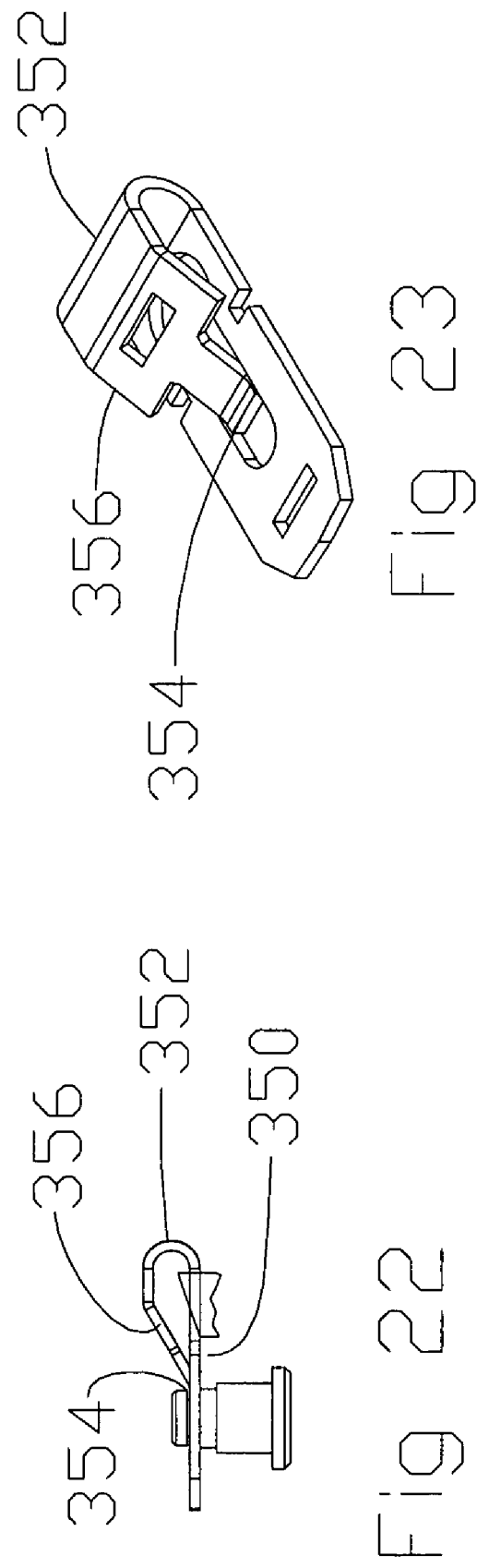

PIVOTAL KNIFE MOUNTING ARRANGEMENT

CROSS-REFERENCE TO RELATED APPLICATIONS

This application is a Divisional of U.S. patent application Ser. No. 10/387,100, filed Mar. 12, 2003, now U.S. Pat. No. 6,834,486 entitled PIVOTAL KNIFE MOUNTING ARRANGEMENT.

STATEMENT-REGARDING FEDERALLY SPONSORED RESEARCH OR DEVELOPMENT

Not Applicable

FIELD OF THE INVENTION

The present invention relates to a pivotal mounting arrangement for mounting a knife to a rotary disc, which makes replacement, or reorientation of the blade possible using only common tools.

BACKGROUND OF THE INVENTION

Knives used on rotary disc mowers contact the crop material at high speeds, in order to cut effectively. This results in inherent dulling and wear. At times these knives contact other objects such as the ground, rocks etc. causing additional wear. As a result the knives must routinely be maintained.

The knives are pivotally mounted to discs, in a manner to reduce impact loading on the sharpened edge when striking an obstacle. FIGS. 1–4 illustrate a prior art mounting arrangement. Mower disc assembly 10 includes knife adapter 30 that is attached to the bottom side of disc body 20, retained with bolt 15 which passes through aperture 26 of disc 20 and into threaded aperture 36 of knife adapter 30. The knife adapter 30 can alternatively be welded to disc body 20. Knife adapter 30 further includes a cylindrical aperture 32 that is located concentric with a cylindrical aperture 22 of the disc body 20, together defining the pivot axis of knife 50. Knife 50 includes a cylindrical aperture 52, sized to allow sleeve portion 12 of bolt 14 to pass through allowing sufficient clearance so that the knife 50 will pivot freely. The mounting arrangement is completed by installing bolt 14 through the aperture 52 of the blade 50, then through the aperture 32 of knife adapter 30, and finally through aperture 22 of disc body 20, and into its mating nut 16.

The top side of the disc body 20 is in contact with the material being cut, functioning to lift and propel the cut material away from the knife. It is exposed to significant wear, along with any components located on the top side of the disc 20, such as nut 16. If nut 16 is subjected to sufficient wear, the hex configuration of its outer surface can be degraded to the point that a wrench no longer mates adequately to allow removal. In order to protect the nut 16 from this excessive wear prior art mounting arrangements have included a wear protector 17 mounted on the top of the disc body, to protect the nut 16 from this excessive wear.

Disc 20 is adapted to provide for this mounting arrangement by providing mounting surface 24 on disc body 20 for supporting wear protector 17. The disc 20 further includes a transition area to the raised portion 28. This raised portion 28 tapers such that at the far outer diameter of the disc 20, it does not exist. At lesser diameters the raised portion is increasingly larger. This raised portion 28, and the transition area between it and the mounting surface 24, provides protection for bolt 15, which thus does not require a wear protector.

The knife adapter 30 often includes a tab 34 that prevents full rotation of the knife 50, in order to control its location, in order to avoid interference with other components of the machine.

This mounting arrangement requires that the several pieces be disassembled with wrenches in order to maintain the knives which is costly and difficult due to the number of knives on a machine.

BRIEF SUMMARY OF THE INVENTION

According to the present invention there is provided an improved mounting arrangement for a knife to a disc for use on a rotary disc cutter that eliminates the need for a threaded connector and the associated nut, providing a positive retention method on the top side of the disc. In addition it provides a method of removing the knife from the disc without the use of wrenches, simply requiring a tool to pry, such as a screw driver. A further feature is a low profile retainer that does not need to be protected by a wear protector.

BRIEF DESCRIPTION OF THE DRAWINGS

FIG. 1 is an exploded view of a prior art mounting arrangement of a knife onto a mower disc;

FIG. 2 is a partial top plan view of a mower disc with knife mounted in accordance with the prior art as illustrated in FIG. 1;

FIG. 3 is a top plan view of a knife adapter of the prior art knife mounting;

FIG. 4 is a partial top plan view of the mower disc configured for the prior art knife mounting;

FIG. 8 is a top plan view and an exploded view of the mounting arrangement of a knife onto a mower disc of the present invention;

FIG. 9 is a partial top plan view of the mower disc configured for the knife mounting arrangement of the present invention;

FIG. 10 is a top plan view of a blade retainer of the knife mounting arrangement of the present invention;

FIG. 11 is a top plan view of a knife adapter of the knife mounting arrangement of the present invention;

FIG. 15 is a partial top plan view of the mounting arrangement of a knife onto a mower disc of a second embodiment of the present invention;

FIG. 15a is an exploded view of FIG. 14;

FIG. 16 is a partial top plan view of the mower disc configured for the knife mounting arrangement of a second embodiment of the present invention;

FIG. 17 is a top plan view of a blade retainer of the knife mounting arrangement of a second embodiment of the present invention;

FIG. 18 is a top plan view of a knife adapter of the knife mounting arrangement of a second embodiment of the present invention;

FIG. 19 is a side view of a retaining pin of the present invention;

FIG. 20 is a side view of a second embodiment of a retaining pin of the present invention;

FIG. 21 is a top plan view of a retainer of the knife mounting arrangement of the present invention illustrating features to aid disassembly;

FIG. 22 is side view of an alternate embodiment of a retainer; and

FIG. 23 is a perspective view of the retainer in FIG. 22.

DETAILED DESCRIPTION OF THE INVENTION

Figure 5:
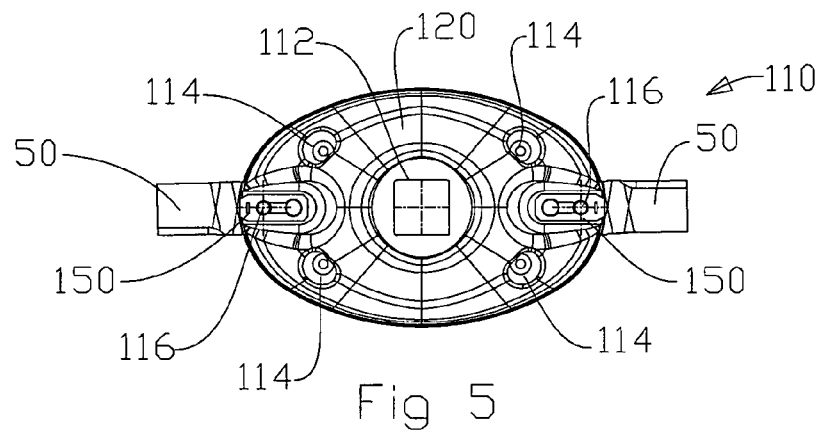
FIG. 5 is a top plan view of a mower disc with knives mounted in accordance with the present invention.

Referring now to the drawings, like reference numerals designate identical or corresponding parts throughout the several views. The included drawings reflect the current preferred and alternate embodiments. There are many additional embodiments that may utilize the present invention. The drawings are not meant to include all such possible embodiments.

Figure 6:
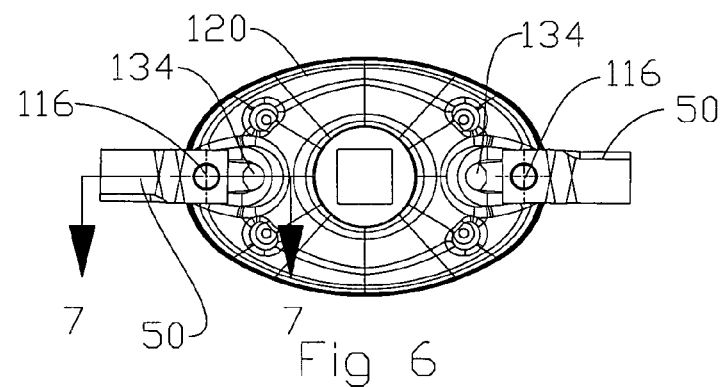
FIG. 6 is a bottom plan view of a mower disc with knives mounted in accordance with the present invention.
Figure 7:
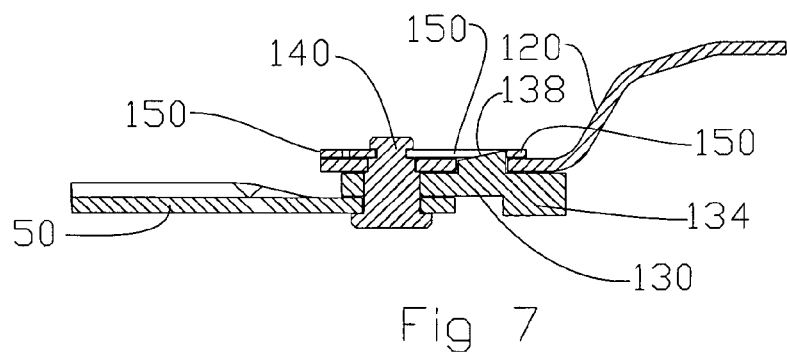
FIG. 7 is a cross-sectional side view of a mower disc, as defined by section line 7—7 in FIG. 6, with the knives mounted in accordance with the present invention.

The FIGS. 5–7 illustrate a mower disc assembly 110 of the present invention. A disc 120 includes a center pilot hole 112 that controls its alignment and location when installed onto a cutter bar which is comprised of a series of gears, a supporting frame/housing, and driveline to transfer power from a tractor PTO to the cutterbar. Additional holes 114 allow retainers, not shown, to securely attach other components such as crop deflectors, not shown, to the mower disc. Two knives 50 are installed onto the bottom of disc body 120, each with a knife adapter 130, a pin 140 and a retainer 150. The knife is free to rotate about pivot axis 116 until it contacts a tab 134 of the knife adapter 130.

FIGS. 8–11 further illustrate a single knife mount of this embodiment of the present invention. The disc body 120 includes two cylindrical apertures 122 and 126, and a mounting surface 124, as illustrated in FIG. 9, on each side, for each knife 50. It further includes a transition between the mounting surface 124 and raised portion 128.

Figure 8A:
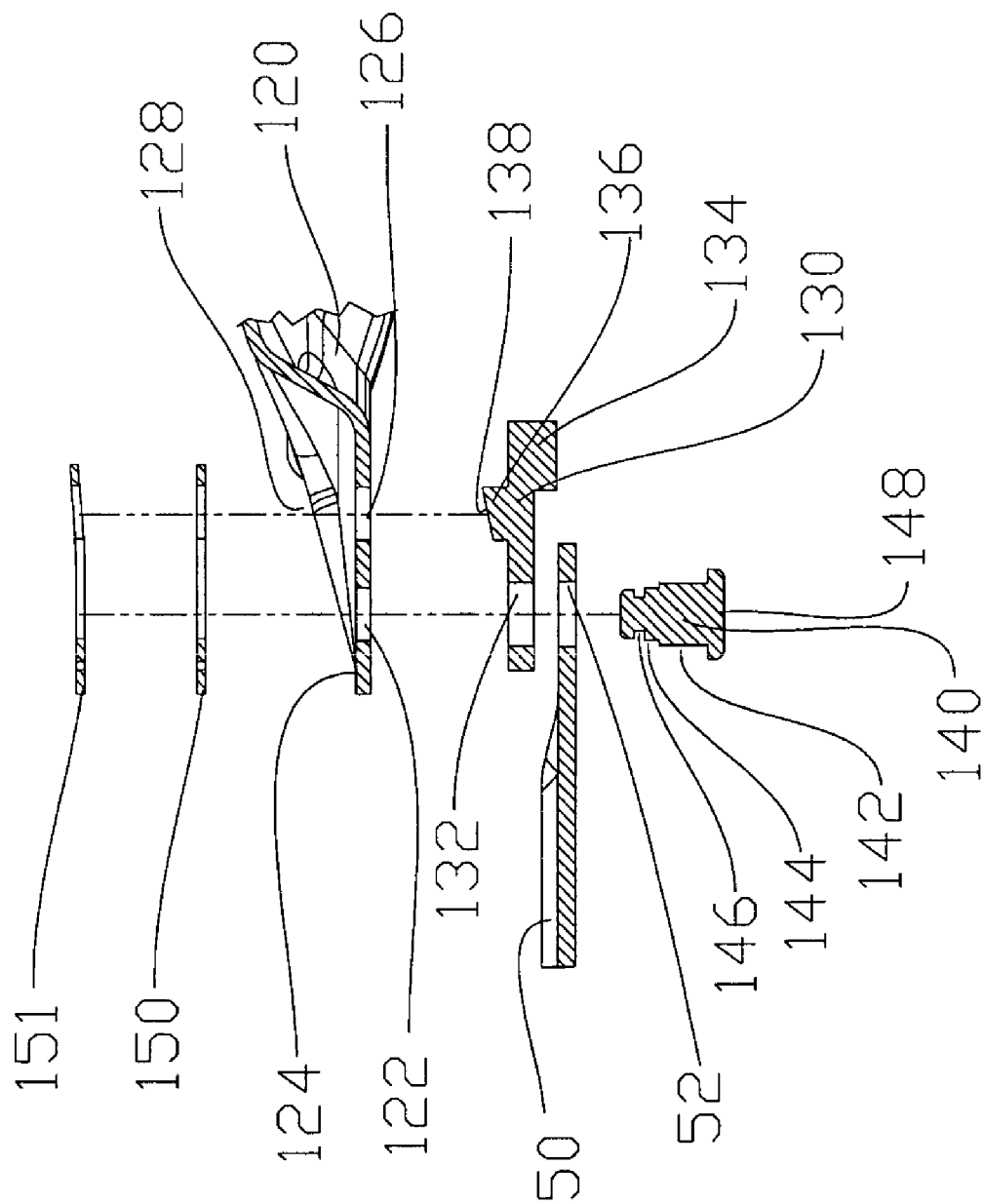
FIG. 8a is an exploded view of FIG. 7.

The knife adapter 130 includes a cylindrical aperture 132, a tab 134, and a cylindrical projection 136 as illustrated in FIGS. 8, 8A and 11. The knife adapter 130 is fixedly attached to the bottom side of disc body 120, the preferred attachment method is welding, such that cylindrical projection 136 passes through aperture 126 of disc body 120 and extends above the mounting surface 124.

Pin 140 includes a first cylindrical portion 142 with a diameter slightly smaller than the aperture 52 in the blade 50, and a second cylindrical portion 144 that is slightly smaller than the aperture 122 of disc 120. It also includes a head portion 148 with a diameter larger than the aperture 52 in the knife 50. It further includes a retaining groove 146, located on the second cylindrical portion 144, with a width that slightly exceeds the thickness of retainer 150, and has a groove diameter that is smaller than the diameter of the second cylindrical portion 144.

Retainer 150 is made of a spring material of a thickness such that a significant force is required in order to deflect the retainer 150, yet it can be deflected significantly without being permanently deformed. This thickness is equal to or less than the material thickness of the disc body 120. It includes a key-hole shaped aperture 152 with a first end 154 and a second end 156. The first end 154 is wide enough that retainer 150 can be installed over the second end 144 of pin 140. The second end 156 of the key-hole aperture 152 is cylindrical with a diameter slightly larger than the groove 146 of pin 140.

The blade 50 is mounted to the disc by passing pin 140 through the aperture 52 in knife 50, then through aperture 132 in knife adapter 130 and aperture 122 in disc 120 such that groove 146 is located above surface 124. Pin 140 is retained in this position by placing retainer 150 onto the pin, passing the first end of the key-hole aperture 152 over the second end 144 of pin 140 until the retainer is against the surface 124 of disc 120. The retainer is then slid perpendicular (right in FIGS. 8 and 8A) to the pin 140, such that the second end 156 of the keyhole shaped aperture 152 engages the groove 146.

Figure 7A:
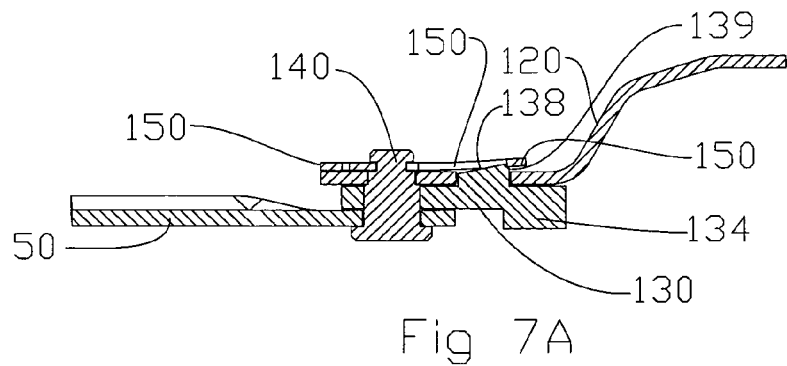
FIG. 7a is a view like FIG. 7, but of a slightly modified version wherein the retainer is not completely flat in the retained position so that it is easier to get a screwdriver under it for removal at a later time.

As retainer 150 is being slid along surface 124 a leading side 158 will come in contact with the ramped surface 138 of cylindrical projection 136 of knife adapter 130, which is extending above surface 124, through aperture 126 of disc 120. In order to slide retainer 150 to its proper position the retainer will be deflected up the ramped portion 138 of knife adapter 130. Upon reaching the installed position the retainer 150 will snap positively into place when first end of key-hole shaped aperture 152 slips over the cylindrical portion 136 of knife adapter 130, at such time the retainer 150 will return back towards its unloaded position, -where it is straight as illustrated in FIG. 8A. Alternatively curved retainer 151, with a slight bend, could be utilized. If the curved retainer 151 is utilized, then it will snap towards its unloaded position represented by this slightly curved shape. In this position as shown in FIG. 8, the retainer 150 is held in position by the cylindrical projection 136. In order for it to move along surface 124 the leading side 158 of retainer 150 will need to be deflected far enough to clear the cylindrical projection 136 of blade retainer. In this manner, the pin 140 and knife 50 are retained to the disc 120, and removal of a knife 50 can be accomplished simply by using a tool capable of prying the leading end 158 of retainer 150 up and over the cylindrical projection 136 to the point it can be slid along surface 124. The removal operation is enhanced if the leading edge 158 is raised slightly above the top surface 124. This slightly raised area can be provided by a slightly curved retainer 151, or by providing an additional small step 139 as illustrated in FIG. 7A.

This mounting arrangement of FIGS. 5–8 thus provides a knife retention system that includes a retainer with a material thickness less than the material thickness of the disc, and a pin which does not require substantial wear protection. The raised portion 128 of the disc body 120 adequately protects the pin 140, thus there is no need for an additional wear protector. The overall height of the retaining components is small, minimizing the potential affect on the standing crop that is being cut.

Figure 12:
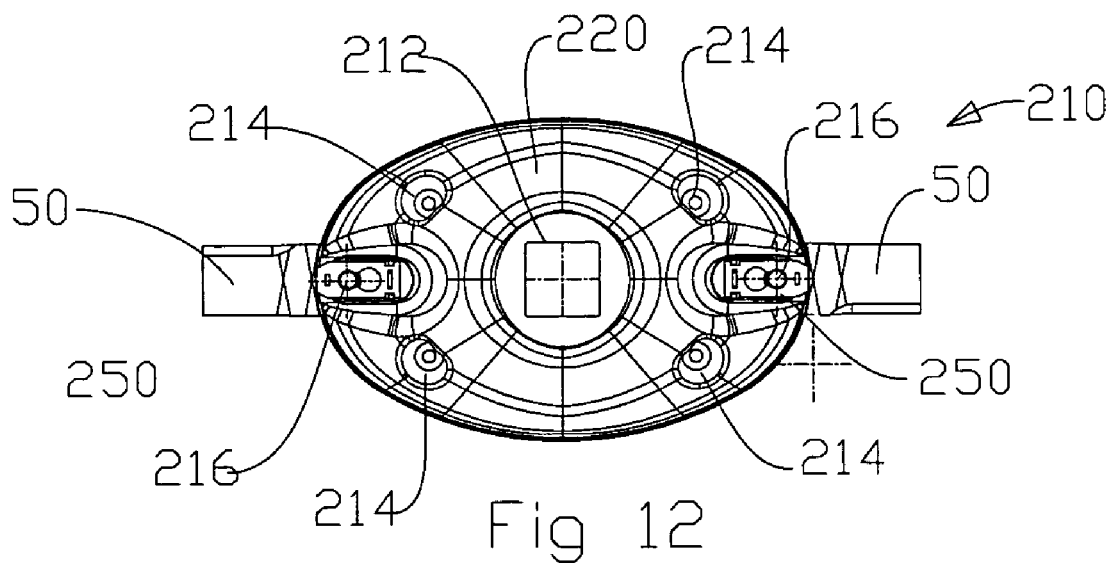
FIG. 12 is a top plan view of a mower disc with knives mounted in accordance with a second embodiment of the present invention.
Figure 13:
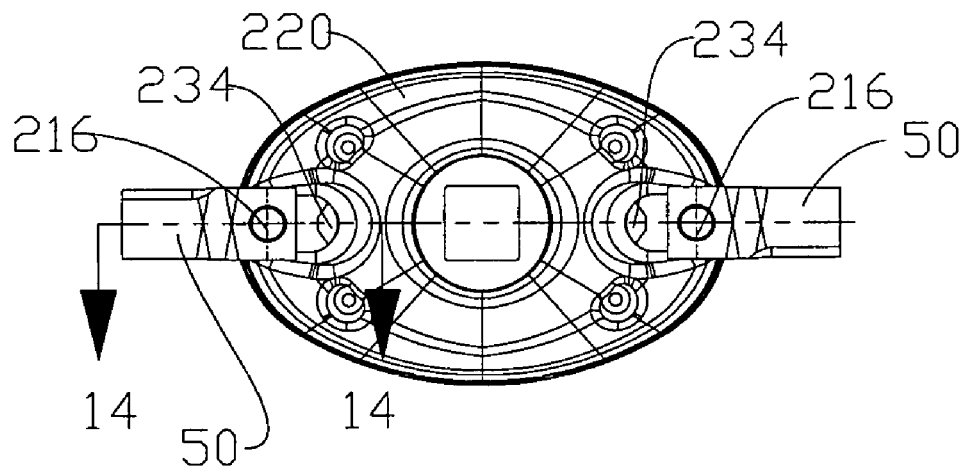
FIG. 13 is a bottom plan view of a mower disc with knives mounted in accordance with a second embodiment of the present invention.
Figure 14:
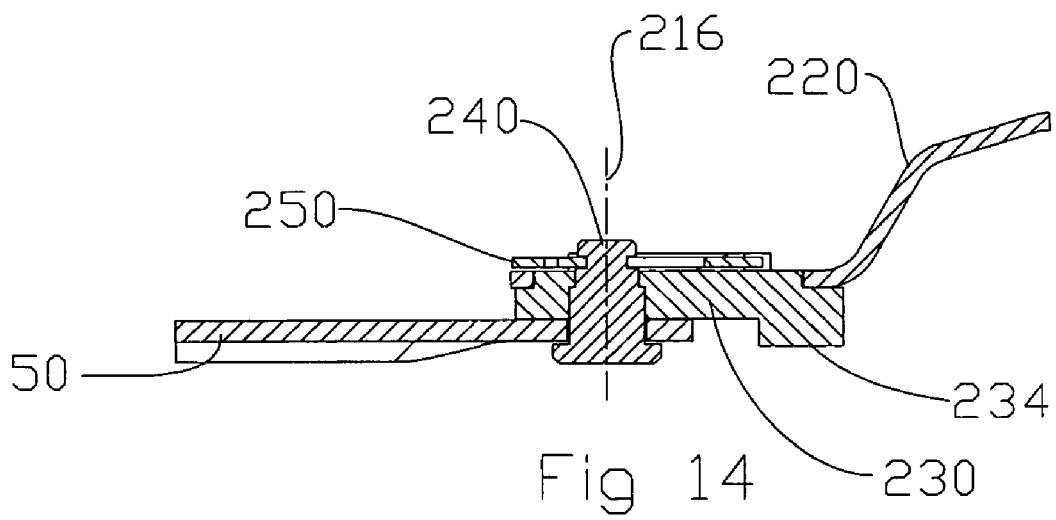
FIG. 14 is a cross-sectional side view of a mower disc, as defined by section line 14—14 in FIG. 13, with the knives mounted in accordance with a second embodiment of the present invention.

FIGS. 12–14 illustrate a second embodiment of a mower disc assembly 210 of the present invention. A disc 220 includes a center pilot hole 212 that controls its alignment and location when installed onto a cutter bar. Additional holes 214 allow retainers, not shown, to securely attach other components such as crop deflectors, not shown to the mower disc. Two knives 50 are installed onto the bottom of disc body 220, each with a knife adapter 230, a pin 240 and a retainer 250. The knife is free to rotate about pivot axis 216 until it contacts a tab 234 of the knife adapter 230.

FIGS. 15–18 further illustrate a single knife mount of this embodiment of the present invention. The disc body 220 includes one slot-shaped aperture 222, and a mounting surface 224, as illustrated in FIG. 16, on each side, for each knife 50. The previously described embodiment could also be implemented with a disc body configured in this manner, if the knife retainer 130 were configured in accordance. Disc body 220 further includes a transition between the mounting surface 224 and raised portion 228.

The knife adapter 230 includes a cylindrical aperture 232, a tab 234, and a projection 236 shaped to fit into the slot-like aperture 222 of disc 220, as illustrated in FIGS. 15 and 18. Projection 236 includes a surface 237 and further includes a top portion 238 with ramped tabs 260. The knife adapter 230 is fixedly attached to the bottom side of disc body 220, the preferred attachment method is welding, such that projection 236 passes through aperture 222 of disc body 220 and top portion 238 extends above the mounting surface 224 while surface 237 is in-line with mounting surface 224, or is slightly raised above surface 224, As illustrated in FIG. 15A, pin 240 includes a first cylindrical portion 242 with a diameter slightly smaller than the aperture 52 in the blade 50, and a second cylindrical portion 244 that is slightly smaller than cylindrical portion 244. It also includes a head portion 248 with a diameter larger than the aperture 52 in the knife. It further includes a retaining groove 246, located on the second cylindrical portion, with a width that slightly exceeds the thickness of retainer 250, and has a groove diameter that is smaller than the diameter of the second cylindrical portion 256.

Retainer 250 is made of a spring material of a thickness such that a significant force is required in order to deflect the retainer, yet it can be deflected significantly without being permanently deformed. It includes a key-hole shaped aperture 252 with a first end 254 and a second end 256. The first end 254 is wide enough that retainer 250 can be installed over the second end 246 of pin 240. The second end 256 of the key-hole aperture 252 is cylindrical with a diameter slightly larger than the groove 246 of pin 240, and smaller than the diameter of the second end 244 of pin 240. The retainer 250 further includes two notches 257, one on each side. Retainer 250 will have an unloaded shaped, which is flat as illustrated in FIG. 15A. It could alternatively include a slightly bent portion at the leading edge 258, to assist removal, as previously described for retainer 151.

The blade 50 is mounted to the disc by passing pin 240 through the aperture 52 in knife 50, then through aperture 232 in knife adapter 230 such that groove 246 is located above surface 237 or 224. Pin 240 is retained in this position by placing retainer 250 onto the pin, passing the first end 254 of the key-hole aperture 252 over the second end 244 of pin 240 until the retainer is against the surface 224 of disc 220 or surface 237 of knife retainer 230. The retainer is then slid perpendicular to the pin 240, such that the second end 256 of the keyhole shaped aperture 252 engages the groove 246.

As retainer 250 is being slid along surface 226 or 237 a leading side 258 will come in contact with ramped tabs 260 of knife adapter 230, which extend above surface 224 and/or surface 237, through aperture 222 of disc 220. In order to slide to its proper position the retainer will be deflected up the ramped tabs 260 of knife adapter 230. Upon reaching the installed position the retainer 250 will snap into place when notches 257 align with the ramped tabs 260 of knife adapter 230, the retainer 250 returning back towards it unloaded position where it is straight as shown in FIG. 15. In this position, the retainer 250 is held in position by the tabs 260. In order for it to move along surface 224 or 237, the leading side 258 of retainer 250 will need to be deflected up, far enough to clear the ramped tabs 260 of knife adapter 230, before it can be slid along surface 224 or 237. In this manner, the pin 240 and knife 50 are retained to the disc 220, and removal of a knife 50 can be accomplished simply by using a tool capable of prying retainer 250 up to the point it can be slid along surface 124 or 237. The prying tool can, for example, be a screw driver and the leading edge may be held from the surface 124 by a tab, such that the retainer 250 is slightly deflected in the installed position, or by the fact that the retainer includes a slight bend.

The ramped tabs 260 of knife adapter 230 and the cooperating notches 257 of retainer 250 in this second embodiment provide the same function as the projection 136 and first end 154 of aperture 152 of the first embodiment. These are examples of many different types of arrangements that could be utilized to secure the retainer to the blade stop, or a different feature of the mower disc itself.

The retainers, as in retainer 150 and 250, may include slot 300, as illustrated in FIG. 21, which is provided for disassembly. The slot 300 will be sized and positioned such that a screwdriver, or the like will be able to be utilized to engage the slot in order to assist in prying on the retainer to slide it relative to the disc.

Additional slots, such as slot 302 shown in FIG. 21, or other surface features may be added in order that the retainers will break at defined locations during disassembly. Thus, when the retainer is pried-on to remove the knife, the section of the retainer that is engaged with the tabs or projections of the blade stop or disc will separate from that portion that is engaged with the pin. This would allow both of the resulting pieces to be easily removed.

FIGS. 19 and 20 illustrate optional configurations of the grooves in the pin 140 and 240. The grooves could be full annular grooves 247 as illustrated in FIG. 19, or slots 245, one on each side as illustrated in FIG. 20.

FIGS. 22 and 23 illustrate an additional embodiment of a retainer 350 with an additional curved section 352. The end 354 is narrow enough to fit into the key-hole slot of the retainer, similarly shaped to the key hole slots in retainers 130 and 230. The end 354 will then engage with the groove in the pin to increase the bearing surface under the pin head and providing a locking feature that prevents the retainer 350 from sliding. End section 356 forms a tapered profile, approximately paralleling the raised portion 128, 228 of disc 120, 220 such that the disc 120, 220 will protect it.

Obviously many modifications and variations of the present invention are possible in light of the above teachings. It is therefore to be understood that, within the scope of the appended claims, the invention may be practiced otherwise than as specifically described.

We claim:

1. Apparatus comprising:
   a cutting knife with an aperture therein;
   a rotary member, the rotary member being disposed for rotation about a first axis, an opening is disposed in the rotary member;

a knife adapter disposed in said opening, said knife adapter having an aperture therein;

a pin disposed about a second axis, one end of the pin being operatively configured so that it will not pass through the aperture in the knife and the other end of the pin having a recess therein;

said pin extending through the aperture in the knife and the aperture in the knife adapter, a retainer also being disposed over the other end of the pin to a first position thereof; and when the retainer is moved in a direction transverse to the axis of the pin to a second position of the retainer a first part of the retainer engages the recess in the pin and a second part of the retainer engages a ramped projection to hold the retainer from moving from the recess in the pin wherein the ramped projection is operatively attached to the knife adapter, whereby movement of the second part of the retainer over the ramped projection causes the second part of the retainer to move at least partially in the first parallel direction to the second axis when moved toward the second position thereof and then back in an opposite direction to the first parallel direction once the second part of the retainer is disposed completely over the projection.

2. The apparatus of claim 1 wherein said ramped projection has a structure thereon for holding the second part of the retainer in a position wherein a prying device can easily be placed under the second part of the retainer for ease in removal of the retainer.

3. A method of using an apparatus comprising: a cutting knife with an aperture therein; a rotary member, the rotary member being disposed for rotation about a first axis, an opening is disposed in the rotary member; a knife adapter disposed in said opening, said knife adapter having an aperture therein; a pin disposed about a second axis, one end of the pin being operatively configured so that it will not pass through the aperture in the knife and the other end of the pin having a recess therein; said pin extending through the aperture in the knife and the aperture in the knife adapter, said retainer also being disposed over the other end of the pin to a first position thereof; said method comprising:

moving the retainer in a direction transverse to the axis of the pin so that a first part of the retainer engages the recess in the pin and a second part of the retainer engages a ramped projection; and continuing to move the retainer in said direction transverse to the axis of the pin until the retainer is in a position to hold the retainer from moving from the recess in the pin whereby the movement of the second part of the retainer over the ramped projection causes the second part of the retainer to move at least partially in the first parallel direction to the second axis when moved toward the second position thereof and then back in an opposite direction to the first parallel direction once the second part of the retainer is disposed completely over the projection to hold the retainer from moving from the recess in the pin.

4. The method of claim 3 comprising:

using a prying device under the second part of the retainer to move the second part of the retainer over the ramped projection; and moving the retainer in a direction opposite to said direction transverse to the axis of the pin so that a first part of the retainer disengages the recess in the pin and disengages the ramped projection whereby the cutting knife can be removed for sharpening or replacement.

* * * * *